Feb. 27, 1945.  H. J. SANG  2,370,196
LOAD-STRESS CONVERTER
Filed Dec. 31, 1943    4 Sheets-Sheet 1

INVENTOR
HENRY J. SANG,
BY
*F E Bush*
ATTORNEY

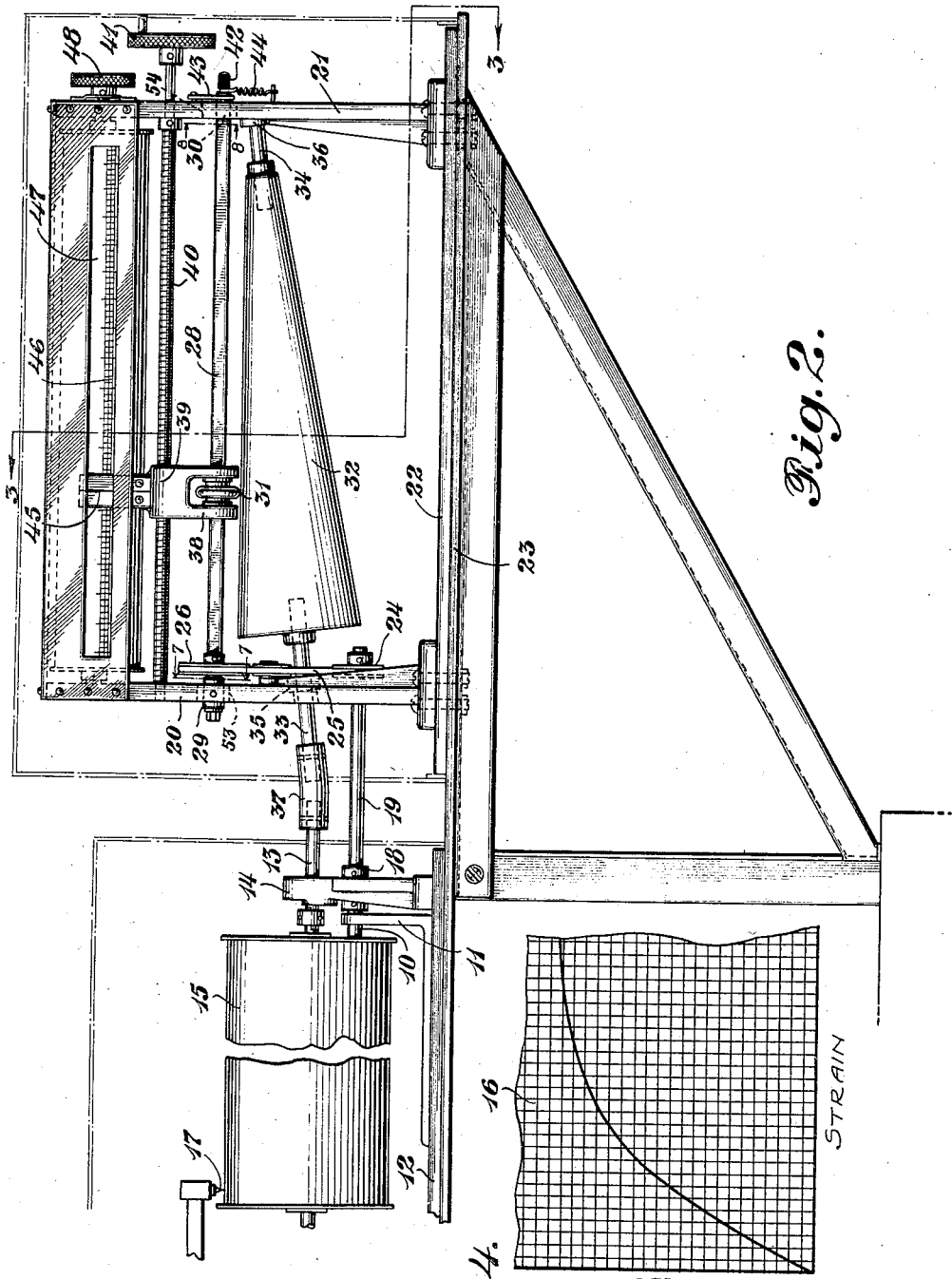

Feb. 27, 1945.   H. J. SANG   2,370,196
LOAD-STRESS CONVERTER
Filed Dec. 31, 1943   4 Sheets-Sheet 4

Inventor
HENRY J. SANG,
By S. V. Bush
Attorney

Patented Feb. 27, 1945

2,370,196

UNITED STATES PATENT OFFICE 2,370,196

LOAD-STRESS CONVERTER

Henry J. Sang, Philadelphia, Pa.

Application December 31, 1943, Serial No. 516,522

8 Claims. (Cl. 73—89)

(Granted under the act of March 3, 1883, as amended April 30, 1928; 370 O. G. 757)

This invention relates to a load-strain recorder as commonly connected with a universal testing machine for the purpose of automatically representing on a chart the load-strain relation of a test specimen in the testing machine. It is assumed that the load-strain recorder is of a conventional type in which the one coordinate of the load-strain curve is produced by means herein termed the load means operatively connected with the weighing system of the testing machine and the other coordinate being produced by means herein termed the strain means operatively connected with a gage registering the strain in the test specimen. In an apparatus such as that above described the load means constitutes a drum carrying a chart and rotatable by and proportionally with the weighing system and in which the strain means constitutes a pen or stylus operable by the strain gage and movable thereby longitudinally of the drum and the chart in proportion to the strain in the specimen, the resulting curve indicating the load-strain characteristics of the test specimen. When, however, it is desired to ascertain the stress-strain characteristics of the test specimen it is necessary to compute the same manually from the data obtained from the load-strain record on the chart which computation requires some time and care.

The principal object of the present invention is the provision of means for so modifying the rate of rotation of the drum of the load means that this rotation be made a fixed proportion of the stress in the test specimen rather than of the load on the test specimen, stress being defined conventionally as the load in the specimen divided by its initial cross-sectional area. This is accomplished in the present invention by interposing between the load means and the drum, variable means including an indicator, by which the rate of rotation of the drum may be varied with respect to the load means while remaining proportional thereto, the indicator of the variable means showing the relative rate of motion between the load means and the drum, said indicator being calibrated in terms of the cross-sectional area of the specimen.

With the above and other objects in view as well as other advantages which may be incident to the use of the improvements, the invention consists of the parts and combinations thereof hereinafter set forth and claimed with the understanding that the several necessary elements constituting the same may be varied in proportion and arrangement without departing from the nature and scope of the invention as defined in the appended claims.

In order to make the invention more clearly understood there are shown in the accompanying drawings, means for carrying the invention into practical effect, without limiting the improvements in their useful application to the particular constructions which for the purpose of explanation has been made the subject of illustration.

In the accompanying drawings:

Fig. 2 is a front elevational view of the structure shown in Fig. 1;

Fig. 4 is a fragmentary elevational view of a chart having a stress-strain curve delineated thereon;

Figure 1:
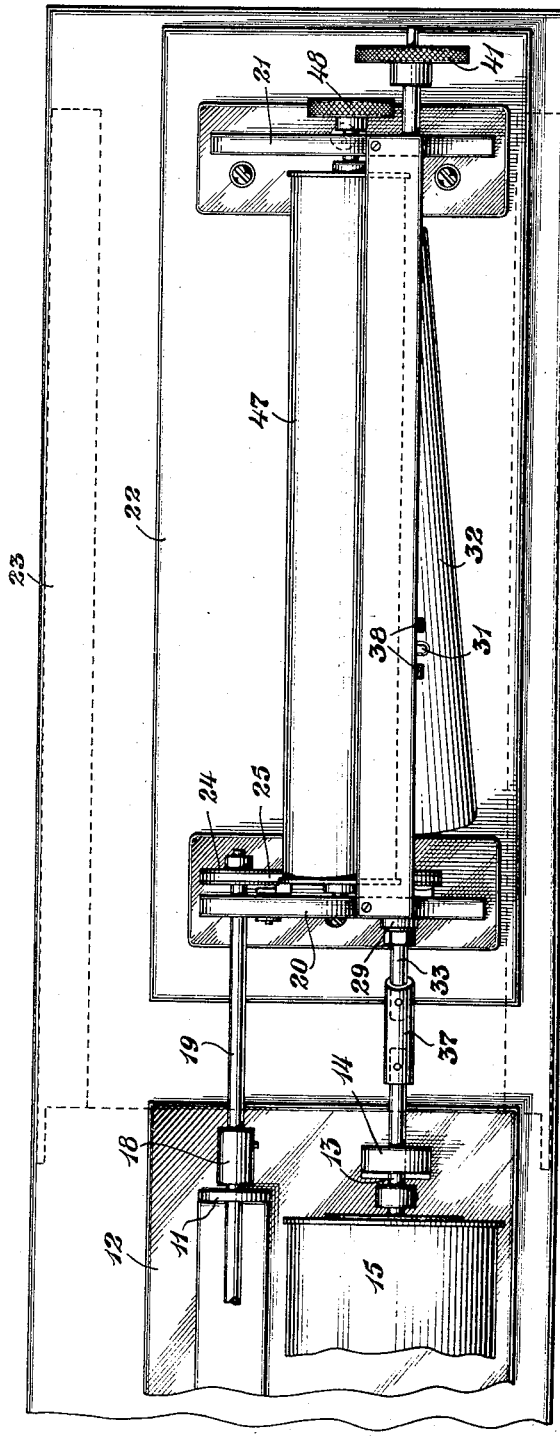
Fig. 1 is a plan view of a load-stress converter constructed in accordance with the invention.
Figure 6:
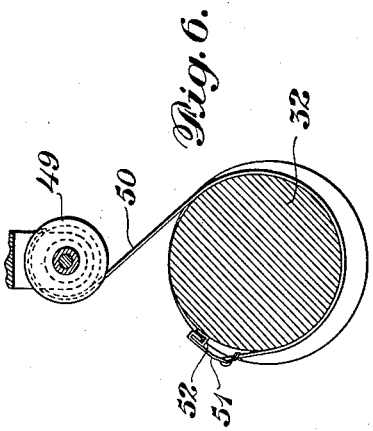
Fig. 6 is a transverse vertical sectional view taken on line 6—6 of Fig. 5.
Figure 5:
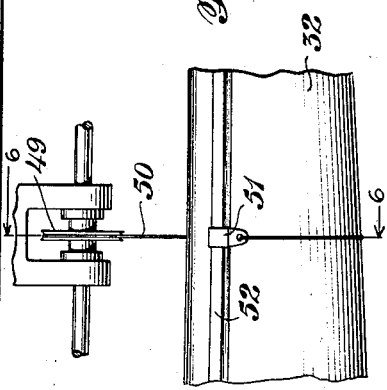
Fig. 5 is a fragmentary front elevational view of a modified form of driving means for the drum.
Figure 3:
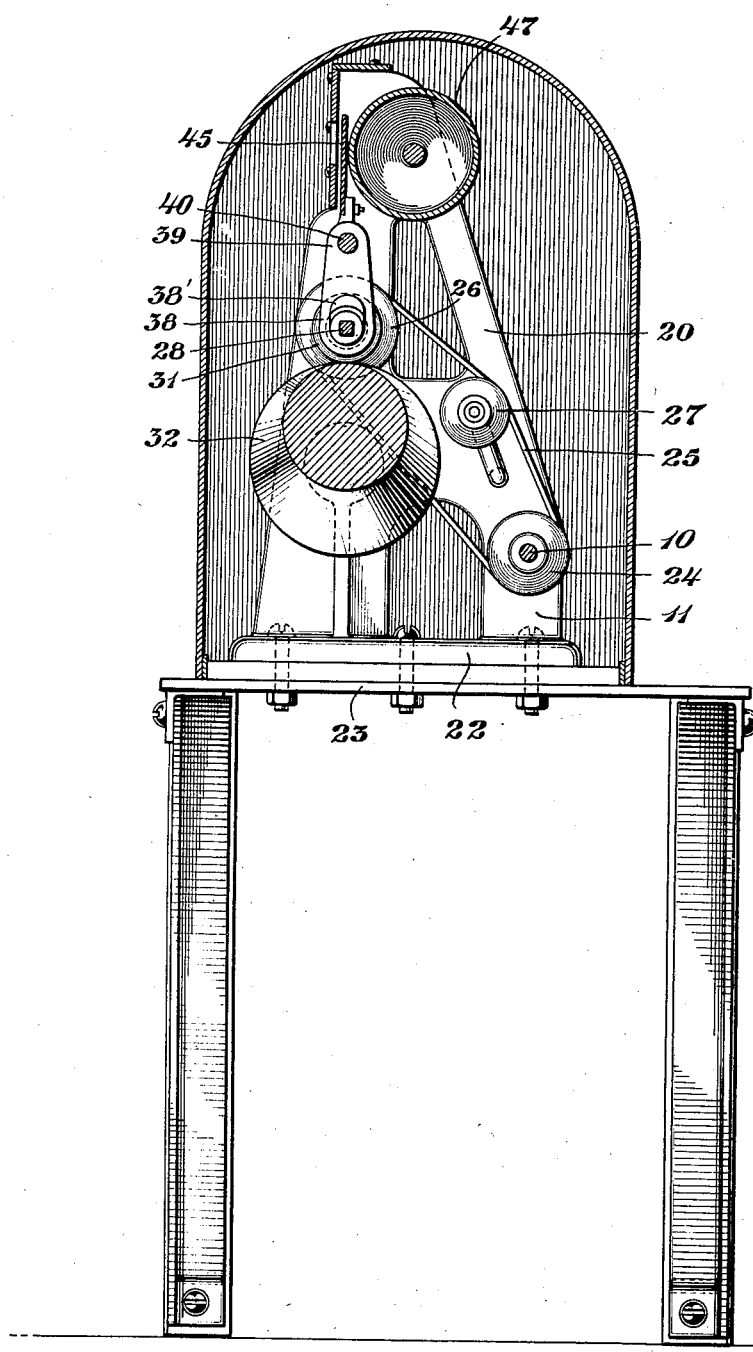
Fig. 3 is a view partly in end elevation and partly in vertical transverse section taken on line 3—3 of Fig. 2.

Referring to the drawings, a load-stress converter embodying the invention is shown as being operatively connected with a load-strain recorder of a universal testing machine. This recorder, being of a well known commercial type, is only fragmentarily shown as comprising a shaft 10 which is journalled in a bearing 11 carried by a base or table 12 which shaft rotates in proportion to the load imposed upon the test specimen, through means conventionally associated with universal testing machines such as a drive connected to the pointer shaft of a dial indicating machine. The shaft 10 is ordinarily geared to a shaft 13 which is journalled in a bearing 14 carried by the base 12 and which rotates a drum 15 about which a chart 16 is secured. A pen or stylus 17 is connected by suitable mechanism to the strain gage of the testing machine which measures the deformation of the test specimen, so as to move longitudinally of the drum and chart as they are rotated by the weighing machine, producing a graphic record of changes in load and strain.

Figure 7:
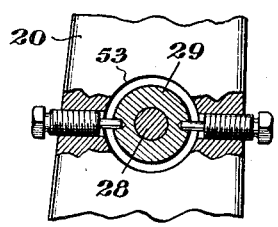
Fig. 7 is a detail view of the bearing 29 taken on line 7—7 of Fig. 2.
Figure 8:
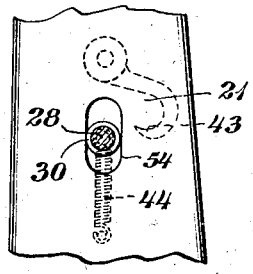
Fig. 8 is detail view of the bearing 30 on line 8—8 of Fig. 2.

According to the present invention the former or fixed gearing between the shafts 10 and 13 is eliminated and the shaft 10 is connected by a coupling 18 to a drive shaft 19 of a variable drive mechanism of the present converter. This mechanism comprises a pair of spaced brackets or standards 20 and 21 which are mounted upon a base plate 22 carried by a table 23 forming an extension of the table 12. The outer end of the shaft 19 is journalled in the bracket 20 and carries a grooved pulley 24 which drives a belt 25 or equivalent drive which passes upwardly around a second grooved pulley 26 and an idler pulley 27. The pulley 26 is fixed to a square shaft 28 the ends of which are rounded and journalled in bearings 29 and 30. The bearing 29 is pivoted for vertical tilting movement in a recess 53 formed in the bracket 20 as indicated in Figs. 2 and 7 and the bearing 30 is mounted for vertical sliding movement in a slot 54 formed in the bracket 21 as indicated in Figs. 2 and 8. A friction drive wheel 31 having a squared central opening is mounted on the squared shaft 28 for rotation therewith and for sliding movement longitudinally therealong and frictionally engages and drives a conical drum 32. This drum is mounted at each end on stub shafts 33 and 34 which are disposed at an angle to the horizontal and are rotatably journalled in bearings 35 and 36 provided in the brackets 20 and 21. The shaft 33 is connected by means of a flexible coupling 37 with the shaft 13 of the recording drum 15 so that the rotation of the conical drum 32 will be transmitted thereto for purposes hereinafter to be set forth.

The friction drive wheel 31 is mounted on the square shaft 28 between the legs of a yoke portion 38 of a nut 39, the legs of said yoke portion having slots 38' formed therein through which the shaft passes. The nut 39 is threaded upon a longitudinally extending adjusting screw 40 the ends of which are rotatably mounted in the brackets 20 and 21 above and parallel to the square shaft 28. The screw 40 is rotated by means of a hand wheel 41 secured to its outer end so as to move the nut 39, yoke 38 and friction wheel 31 longitudinally of the square shaft 28 and conical drum 32, thus to vary the drive or gear ratio between the friction drive wheel 31 and said drum. When the position of the drive wheel 31 is thus adjusted it is lifted out of frictional contact with the drum 32 by means of a handle 42 provided at the outer end of the shaft 28 and is held in such position by a hook 43 against the action of a coil spring 44 which normally holds the shaft 28 down with the wheel 31 in driving engagement with the drum 32. The slots 38' in the yoke portion 38 permit the shaft 28 to be thus raised freely without causing any binding of the nut 39 on its adjusting shaft 40.

An indicator 45 of transparent material is secured to the upper portion of the nut 39 and is provided with a hair line for cooperation with a scale or scales 46 carried by a drum 47 rotatable in the brackets 20 and 21 by a hand wheel 48.

Alternatively, instead of the friction wheel 31 there can be substituted a pulley 49 to which is attached one end of a cord 50, passing around the pulley and thence around the conical drum 32 to which the other end of the cord is attached, in such a manner that rotation of the pulley 49 winds the cord 50 around the pulley 49 and unwinds the cord from the conical drum 32 causing the drum to rotate also, producing the same effect as that of the friction wheel 31 on the conical drum 32 as previously described. The attachment of the cord 50 to the conical drum is made by means of a clip 51 attached to the cord, slidably mounted on a rail 52 attached to the drum in such a manner that the clip 51 may be moved to the desired position, that is into the extension of the plane of the cord on the pulley 49, when the pulley is moved from place to place in the direction of the longitudinal axis of the conical drum.

From the foregoing it will be seen that there is interposed between the load means and the recording drum 15, a variable means including an indicator and scale by means of which the rate of rotation of the drum 15 and chart 16 carried thereby may be varied with respect to the load means. The indicator of the variable means being set at the position on the drum 47 and scales 46 corresponding to the cross-sectional area of a particular test specimen. It is evident that the variable means can be so adjusted to produce for different applied loads on equally stressed specimens of various sizes the same amount of motion of the drum, thus satisfying the purpose of the invention and making it possible to represent the stress-strain rotation on the drum chart.

It is furthermore evident that the scale of the variable means can be calibrated in terms of cross-sectional area of the specimen in such a manner that when this area is known, the variable means may be suitably adjusted by means of the calibrated indicating means, the drum 15 carrying the chart 16 then moving in accordance with stress in the specimen, and the curve drawn on the chart showing the stress-strain relation to a suitable scale. Calibration of the variable means will ordinarily be made by computations involving the scale 46, stress in pounds per square inch per inch on the drum chart, and the motion of the load means in terms of load on the specimens, together with the mechanical constants of gearing, etc. in the variable means.

The drum 47 may be provided with several scales calibrated for different materials or for different characteristics of similar materials or both. Also, it will be apparent that a scale may be provided on the drum 32 and an indicating pointer may be mounted on or adjacent to the nut 39, thus eliminating the drum 47 and related parts.

Figure 9:
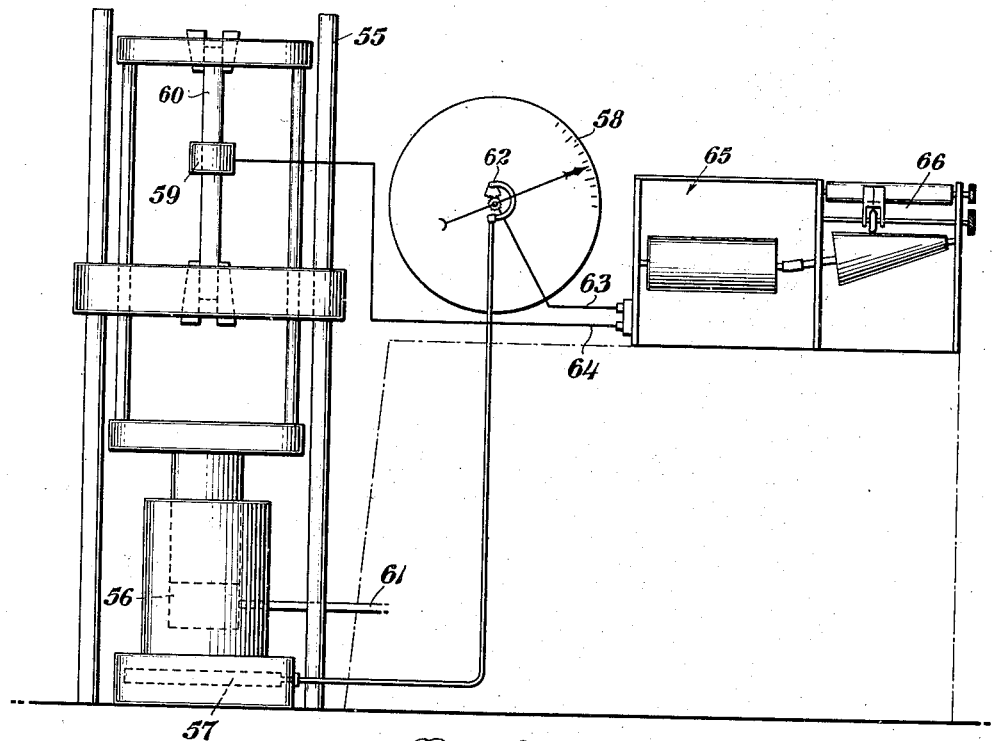
Fig. 9 is diagrammatic view schematically showing a testing machine, weighing mechanism, and gage for indicating elongation of the test specimen.

In Fig. 9 there is schematically shown a testing machine 55, weighing mechanism including a hydraulic loading ram 56, a hydraulic weighing capsule 57, and a load indicator 58, and a strain gage 59 for indicating elongation of the test specimen 60. A pump line is indicated at 61. A Bourdon tube is shown at 62. Electrical connections 63 and 64 from the load indicator and strain gage, respectively, are shown connected to the recorder which is diagrammatically indicated at 65, for operating the recorder, the load-stress converter being diagrammatically indicated at 66.

It will be understood, as previously stated that the above description and accompanying drawings comprehend only the general and preferred embodiment of the invention and that various changes in construction, proportion and arrangement of the parts may be made within the scope of the appended claims without sacrificing any of the advantages of the invention.

The invention described herein may be manufactured and used by or for the Government of the United States of America for governmental purposes without the payment of any royalties thereon or therefor.

I claim:

1. In combination with a testing machine having a weighing mechanism for indicating the load to which the test specimen is subjected; a gage for indicating the elongation of said test specimen under load and means for graphically recording said indications; a conical drum for driving said recording means, an indicating means calibrated in terms of cross-sectional area of specimens to be tested, a drive wheel driven by said weighing mechanism and disposed in frictional contact with said conical drum for driving the same, and means for adjusting said drive wheel longitudinally of said conical drum and said indicating means to vary the movement of said recording means in accordance with the load divided by original cross-sectional area in a test specimen of selected cross-sectional area.

2. In combination with a testing machine having a weighing mechanism for indicating the load to which the test specimen is subjected; a gage for indicating the elongation of said test specimen under load and means for graphically recording said indications; a conical drum for driving said recording means, an indicating means calibrated in terms of cross-sectional area of specimens to be tested, a shaft disposed parallel to the generatrix of the conical surface of said drum and driven by said weighing mechanism, a drive wheel mounted on said shaft for rotative movement therewith and longitudinal movement thereon and disposed in frictional contact with said conical drum for driving the same, and means for adjusting said drive wheel longitudinally of said drum and said indicating means for varying the movement of said recording means in accordance with the load divided by original cross-sectional area in a test specimen of selected cross-sectional area.

3. In combination with a testing machine having a weighing mechanism for indicating the load to which the test specimen is subjected; a gage for indicating the elongation of said test specimen under load and means for graphically recording said indications; a conical drum disposed at an angle to the horizontal for driving said recording means, an indicating means calibrated in terms of cross-sectional area of specimens to be tested, a shaft disposed parallel to the generatrix of the conical surface of said drum and driven by said weighing mechanism, a drive wheel mounted on said shaft for rotative movement therewith and longitudinal movement thereon and disposed in frictional contact with said conical drum for driving the same, and means for adjusting said drive wheel longitudinally of said drum and said indicating means for varying the movement of said recording means in accordance with the load divided by original cross-sectional area in a test specimen of selected cross-sectional area.

4. In combination with a testing machine having a weighing mechanism for indicating the load to which the test specimen is subjected; a gage for indicating the elongation of said test specimen under load and means for graphically recording said indications; a conical drum for driving said recording means, an indicating means calibrated in terms of cross-sectional area of specimens to be tested, a shaft disposed parallel to the generatrix of the conical surface of said drum and driven by said weighing mechanism, a pulley mounted on said shaft for rotation movement therewith and longitudinal movement thereon, a cord attached to said pulley and to said conical drum to drive said drum and means for adjusting said pulley longitudinally of said drum and said indicating means for varying the movement of said recording means in accordance with the load divided by original cross-sectional area in a test specimen of selected cross-sectional area.

5. In combination with a testing machine having a weighing mechanism for indicating the load to which the test specimen is subjected; a gage for indicating the elongation of said test specimen under load and means for graphically recording said indications; a conical drum for driving said recording means, an indicating means calibrated in terms of cross-sectional area of specimens to be tested, drive means driven by said weighing mechanism and in driving connection with said conical drum for driving the same, and means for adjusting said drive means longitudinally of said conical drum and said indicating means to vary the movement of said recording means in accordance with the load divided by original cross-sectional area in a test specimen of selected cross-sectional area.

6. In combination with a testing machine having a weighing mechanism for indicating the load to which the test specimen is subjected; a gage for indicating the elongation of said test specimen under load and means for graphically recording said indications; a conical drum for driving said recording means, an indicating means calibrated in terms of cross-sectional area of specimens to be tested, a shaft disposed parallel to the generatrix of the conical surface of said drum and driven by said weighing mechanism, drive means between said shaft and said conical drum for driving said drum, said drive means including a rotary drive member mounted on said shaft for rotative movement therewith and longitudinal movement thereon, and means for adjusting said rotary drive member longitudinally of said drum and said indicating means for varying the movement of said recording means in accordance with the load divided by original cross-sectional area in a test specimen of selected cross-sectional area.

7. In combination with a testing machine having a weighing mechanism for indicating the load to which the test specimen is subjected; a gage for indicating the elongation of said test specimen under load and means for graphically recording said indications; a conical drum disposed at an angle to the horizontal for driving said recording means, an indicating means calibrated in terms of cross-sectional area of specimens to be tested, a shaft disposed parallel to the generatrix of the conical surface of said drum and driven by said weighing mechanism, drive means between said shaft and said conical drum for driving said drum, said drive means including a rotary drive member mounted on said shaft for rotative movement therewith and longitudinal movement thereon, and means for adjusting said rotary drive member longitudinally of said drum and said indicating means for varying the movement of said recording means in accordance with the load divided by original cross-sectional area in a test specimen of selected cross-sectional area.

8. In combination with a testing machine having a weighing mechanism for indicating the load to which the test specimen is subjected; a gage for indicating the elongation of said test specimen under load and means for graphically recording said indications; a conical drum for driving said recording means, an indicating means calibrated in terms of cross-sectional area of specimens to be tested, a shaft disposed parallel to the generatrix of the conical surface of said drum and driven by said weighing mechanism, a pulley mounted on said shaft for rotation movement therewith and longitudinal movement thereon, a cord attached to said pulley and to said conical drum to drive said drum, and means for adjusting said pulley longitudinally of said drum and said indicating means for varying the movement of said recording means in accordance with the load divided by original cross-sectional area in a test specimen of selected cross-sectional area, said cord being attached to said conical drum by means of a rail attached to the drum, and a clip slidably mounted on said rail, said cord being attached to said clip and movable thereby along said rail into the extension of the plane of the cord on the pulley as the pulley is moved in the direction of the longitudinal axis of the conical drum.

HENRY J. SANG.